United States Patent [19]

Akiyama

[11] Patent Number: 5,353,862

[45] Date of Patent: Oct. 11, 1994

[54] HUMIDITY CONTROL DEVICE OF AIR CONDITIONER

[75] Inventor: Kazuhiko Akiyama, Fuji, Japan

[73] Assignee: Kabushiki Kaisha Toshiba, Kawasaki, Japan

[21] Appl. No.: 83,540

[22] Filed: Jun. 30, 1993

[30] Foreign Application Priority Data

Aug. 26, 1992 [JP] Japan .................. 4-227261

[51] Int. Cl.$^5$ .............................................. F24F 3/14
[52] U.S. Cl. ............................. 165/21; 236/44 A
[58] Field of Search ............. 62/176.6, 176.1, 176.3; 236/44 A, 44 C, 44 R; 165/21

[56] References Cited

U.S. PATENT DOCUMENTS

| | | | |
|---|---|---|---|
| 2,819,844 | 1/1958 | Dennick | 62/176.1 X |
| 3,957,200 | 5/1976 | Young | 62/176.1 X |
| 4,813,474 | 3/1989 | Umezu . | |

FOREIGN PATENT DOCUMENTS

| | | | |
|---|---|---|---|
| 61-91429 | 9/1986 | Japan . | |
| 63-297955 | 5/1988 | Japan . | |
| 2122139 | 5/1990 | Japan | 236/44.6 |
| 3079975 | 4/1991 | Japan | 62/176.1 |

*Primary Examiner*—William E. Wayner
*Attorney, Agent, or Firm*—Oblon, Spivak, McClelland, Maier & Neustadt

[57] ABSTRACT

A humidity control device of an air conditioner having an air conditioner body and being capable of controlling a humidity as well as conditioning air during heating, drying and like operations, comprises a target humidity setting unit for setting a target humidity in accordance with operation modes, a humidity sensor for detecting a humidity in a room, a humidity setting element for setting a humidity in the room, a control unit for comparing the humidity detected by the humidity detecting element with the humidity set by the humidity setting unit and controlling the compared humidity, and a humidifier responsive to the control unit to receive an operation command signal from the control unit in accordance with the detected and set humidities to thereby control the humidity in the room. The humidifier is arranged independently from the air conditioner body and the control unit transmits a humidifier control signal to the humidifier through a wireless transmission. A controller is further provided for controlling the air conditioner and a remote controller for controlling the operation of the controller is also provided.

30 Claims, 17 Drawing Sheets

| OPERATION MODE / SET TEMPERATURE BY REMOTE CONTROLLER | DRYING | HEATING |
|---|---|---|
| HIGH | 70% | 50% |
| STANDARD | 60% | 40% |
| LOW | 50% | 30% |

| SET TEMPERATURE BY REMOTE CONTROLLER \ OPERATION MODE | DRYING | HEATING |
|---|---|---|
| HIGH | 70% | 50% |
| STANDARD | 60% | 40% |
| LOW | 50% | 30% |

FIG. 7

HUMIDITY CONTROL DEVICE OF AIR CONDITIONER

BACKGROUND OF THE INVENTION

The present invention relates to a humidity control device of an air conditioner for air-conditioning heating, cooling, humidity adjusting and the like operations, and more particularly, to a humidity control device capable of setting the level of humidity in the appropriate ranges of the humidity differently for the drying operation and the heating operation, thus creating a comfortable atmosphere condition.

In conventional technology, the humidity control of the air conditioner for heating and cooling in a room has been performed mainly during the drying operation, i.e. humidifying operation, and is hardly ever performed during the heating operation.

Some air conditioners humidify the room during the heating operation. However, such a humidifying operation in the room is executed based on the drying operation, regardless of operation modes such as cooling, heating and drying modes of the air conditioner. Moreover the humidity set by the remote controller is fixed, for example, at 60% for the intermediate humidity as a standard.

Humidity control by a conventional air conditioner has been carried out by controlling the humidity at a fixed amount, for example, 60%, based on the drying operation. The drying operation is employed during a period of relatively high humidity, for example, approximately 80%-90%, and performs the dehumidifying operation in such a degree that the humidity in the room becomes 60%.

On the other hand, the heating operation is employed during the period of relatively low humidity, for example, approximately 25%-35%, and performs the humidifying operation in such a degree that the humidity in the room becomes 60% based on the drying operation.

In general, the comfortable humidity, that is, the appropriate range of humidity, is said to be between 40%-60%.

In conventional air conditioners, the humidity control during the heating operation is performed based on the drying operation. Thus, even if the humidity is within the appropriate range thereof at a point where the humidity becomes higher than 40%, the lower limit, the uneconomical humidifying operation is still executed until the humidity reaches 60%, causing wasteful consumption of energy.

SUMMARY OF THE INVENTION

In view of the foregoing circumstances, it is an object of the present invention to substantially eliminate defects or drawbacks encountered in the prior art and to provide a humidity control device of an air conditioner in which the target humidity can be altered within the appropriate ranges of the humidity for the drying operation and for the heating operation without performing an uneconomical operation of the air conditioner, thus creating a comfortable atmosphere and achieving energy-saving.

Another object of the present invention is to provide a humidity control device of an air conditioner in which the humidifying control of a humidifier can be performed by radio, i.e. wireless operation, from the body of the air conditioner based on the results of a comparison between the detected humidity by a humidity sensor and the set humidity.

A further object of the present invention is to provide a humidity control device of an air conditioner in which a transmitter for transmitting a signal to a humidifier is disconnectably attached to the body of the air conditioner and the humidifier can be set separate from the body of the air conditioner, thus improving the flexibility of setting the humidifier.

These and other objects are achieved according to the present invention by providing, in one aspect, a humidity control device of an air conditioner capable of controlling a humidity as well as conditioning air during heating, drying and like operations, the humidity control device comprising:

a target humidity setting means for setting a target humidity in accordance with operation modes of the air conditioner; and a control means for comparing a humidity in a room with the target humidity and controlling the compared humidity.

A means for detecting a humidity in a room to be subjected to air conditioning operation is further provided with the humidity control device.

In a detailed aspect, there is provided a humidity control device of an air conditioner having an air conditioner body and being capable of controlling a humidity as well as conditioning air during heating, drying and like operations, the humidity control device comprising:

means for detecting a humidity in a room to be subjected to air conditioning operation;

means for manually setting a humidity in the room in a plurality of operation setting modes;

a target humidity setting means for setting a target humidity in accordance with operation modes of the humidity manually setting means;

control means for comparing the humidity detected by the humidity detecting means with the humidity set by the humidity manually setting means and controlling the compared humidity.

In preferred embodiments, the humidity control device of an air conditioner further comprises a humidifier responsive to the control means and adapted to receive an operation command signal from the control means in accordance with a detected humidity and temperature in the room. Furthermore, the humidity control device comprises a heater, means for detecting a temperature in the room and an inverter which operates in association with the humidifier. The heater and the inverter are not operated at a time when the detected room humidity and room temperature are below the set humidity and temperature to maintain an operation stop condition of the air conditioner. The inverter is operated and the heater is not operated at a time when the detected room humidity is below the set humidity and the detected room temperature is above the set temperature to thereby carry out the drying operation. The heater and inverter are both operated in the drying operation mode at a time when the detected room humidity is above the set humidity and the detected room temperature is below the set humidity. The inverter and heater are both operated in the heating operation mode at a time when the detected room humidity and room temperature are above the set humidity and temperature.

The humidity detecting means and the control means are arranged in the air conditioner body, the humidifier is arranged independently from the air conditioner body, and the control means transmits a humidifier control signal to the humidifier through a wireless transmission.

The humidity control device further comprises means for transmitting the humidifier control signal to the air conditioner body. The transmitting means is provided for the air conditioner body to be detachable. A humidity correcting means is provided for the air conditioner body and adapted to correct the set humidity or the detected humidity, and a controller is provided for controlling air conditioning in the air conditioner body. A remote controller for controlling the operation of the controller and the humidifier into which a humidifier control signal is inputted from the controller through a wireless transmission, arranged independently from the air conditioner body to thereby control the humidity in the room during the heating operation.

The target humidity setting means is arranged in the remote controller and is arranged in the air conditioner body in association with the controller.

The humidity control device further includes a switching circuit means operatively connected to the target humidity setting means and adapted to switch the operation modes of the air conditioner.

The air conditioner body includes an indoor unit installed in the room, an indoor side heat exchanger and an indoor side fan are accommodated in the indoor unit. The humidity detecting means is disposed on an upstream side of the indoor side heat exchanger in parallel to an air flow flown into the indoor side heat exchanger.

In the humidity control device of the air conditioner, the set humidity during the drying operation and that of the heating operation can be altered according to the operation modes by using the target humidity setting means, and the target set humidity during the heating operation can be lowered within the appropriate range of the humidity, thus creating a comfortable atmosphere condition in a room according to the operation modes and achieving energy-saving of the air conditioning operation. The target humidity setting means may be attached to the remote controller or to the body of the air conditioner.

Further, during the heating operation, when the humidity detected by the humidity sensor is lower than the set humidity by the humidity setting means, the humidity control device of the air conditioner is adapted to control the humidity by operating the humidifier, thus creating a comfortable atmosphere condition in the room within the appropriate range of the humidity even during the heating operation.

Since the humidifier is placed independently from the body of the air conditioner, the flexibility of placement of the humidifier can be improved. Even if the humidifier is placed separately, it is operatively connected for cooperation to the controller in the air conditioner body and is controlled integrally therewith. Consequently, it is not necessary to control the humidifier at a different place and time separately from that of the air conditioner, thus enhancing the ease of handling and being convenient.

Furthermore, since the transmitter for controlling the humidifier can be disconnectably attached to the body of the air conditioner, the humidifier can be attached to the transmitter for sale, thus improving the flexibility of sales of local air-conditioning.

Still furthermore, since the humidity set by the humidity setting means can be set at a plurality of settings, finely adjusted humidity settings can be performed according to the operation modes, thus obtaining a comfortable atmosphere condition in the room.

Still furthermore, since the humidity correcting means for correcting the set humidity or the detected humidity is arranged in the air conditioner body, the differences of the sensible temperatures of individuals can be adjusted, thus enabling personal humidity control.

The humidity sensor for detecting the humidity in the room is disposed on the upstream side of the indoor side heat exchanger, parallel to the flow-in air, thus effectively preventing foreign matters such as dust or the like from adhering to the humidity sensor.

In this air conditioner, the remote controller controls the operation of the body of the air conditioner for conditioning air in the room, whereby the controller of the air conditioner body can control the operation of the humidifier which is separately placed from the air conditioner body during the heating operation. Hence, the humidity control can be performed by the operation of the remote controller not only during the drying operation but also during the heating operation according to the operation modes.

The nature and further features of the present invention will be made more clear through the following description with reference to the accompanying drawings.

BRIEF DESCRIPTION OF THE DRAWINGS

In the accompanying drawings:

FIG. 7 is a table showing a target set humidity in an operation mode which is set by a target humidity setting means of the remote controller;

DESCRIPTION OF THE PREFERRED EMBODIMENTS

An embodiment of a humidity control device of an air conditioner according to the present invention will be described hereinafter with reference to the accompanying drawings.

Figure 1:
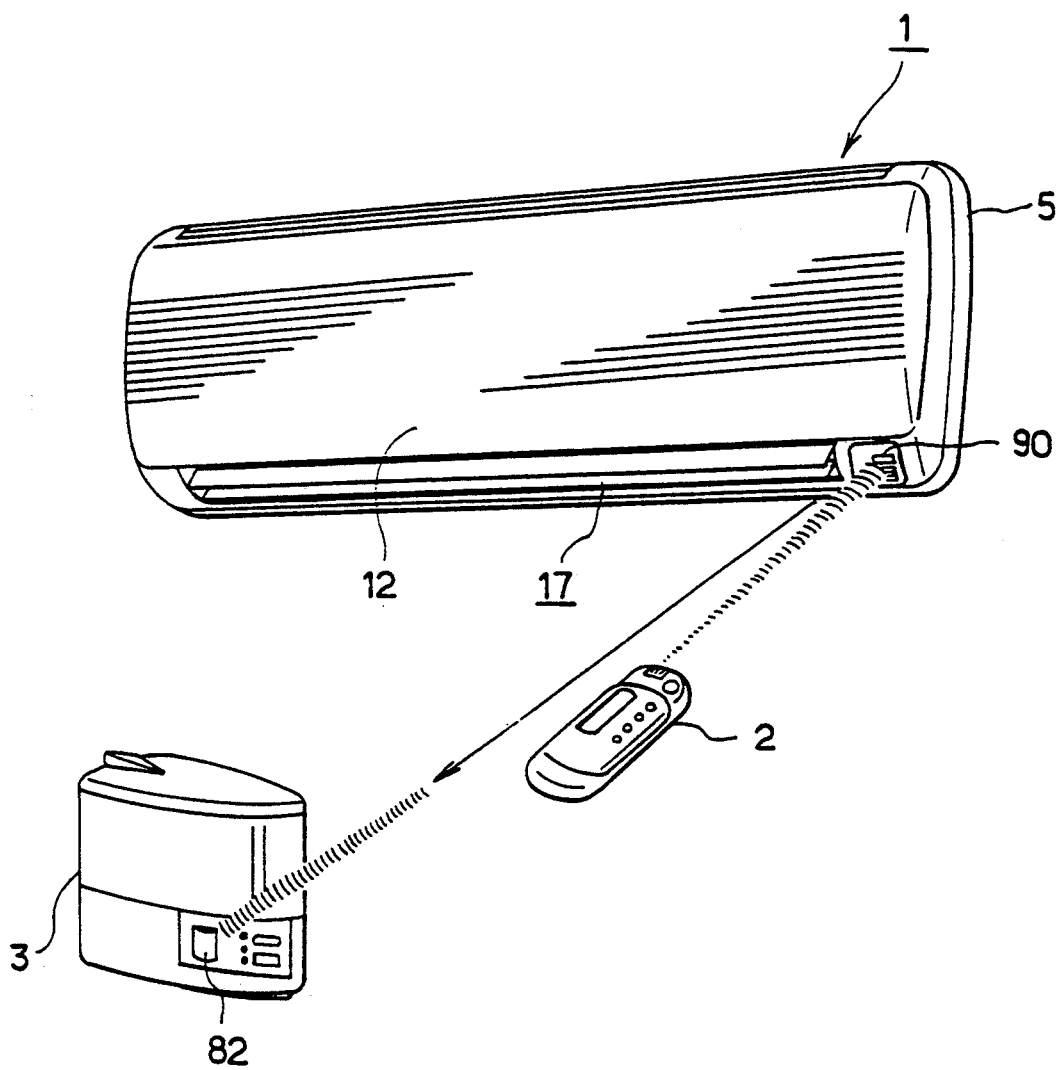
FIG. 1 is a brief perspective view showing an outer appearance of one example of a humidity control device of an air conditioner according to the present invention.

FIG. 1 is a view of an overall construction showing one example of a humidity control device of an air conditioner, and referring to FIG. 1, the air conditioner 1 has a body which carries out heating, cooling, dehumidifying and like operations to adjust the air conditioning in a room. The operation of the body of the air conditioner 1 is adjusted and controlled by a remote controller 2, and the operation of a humidifier 3 is also adjusted and controlled by the remote controller 2. The humidifier 3 is installed separate from the body of the air conditioner 1 and may be sold separately from the air conditioner 1.

Figure 2:
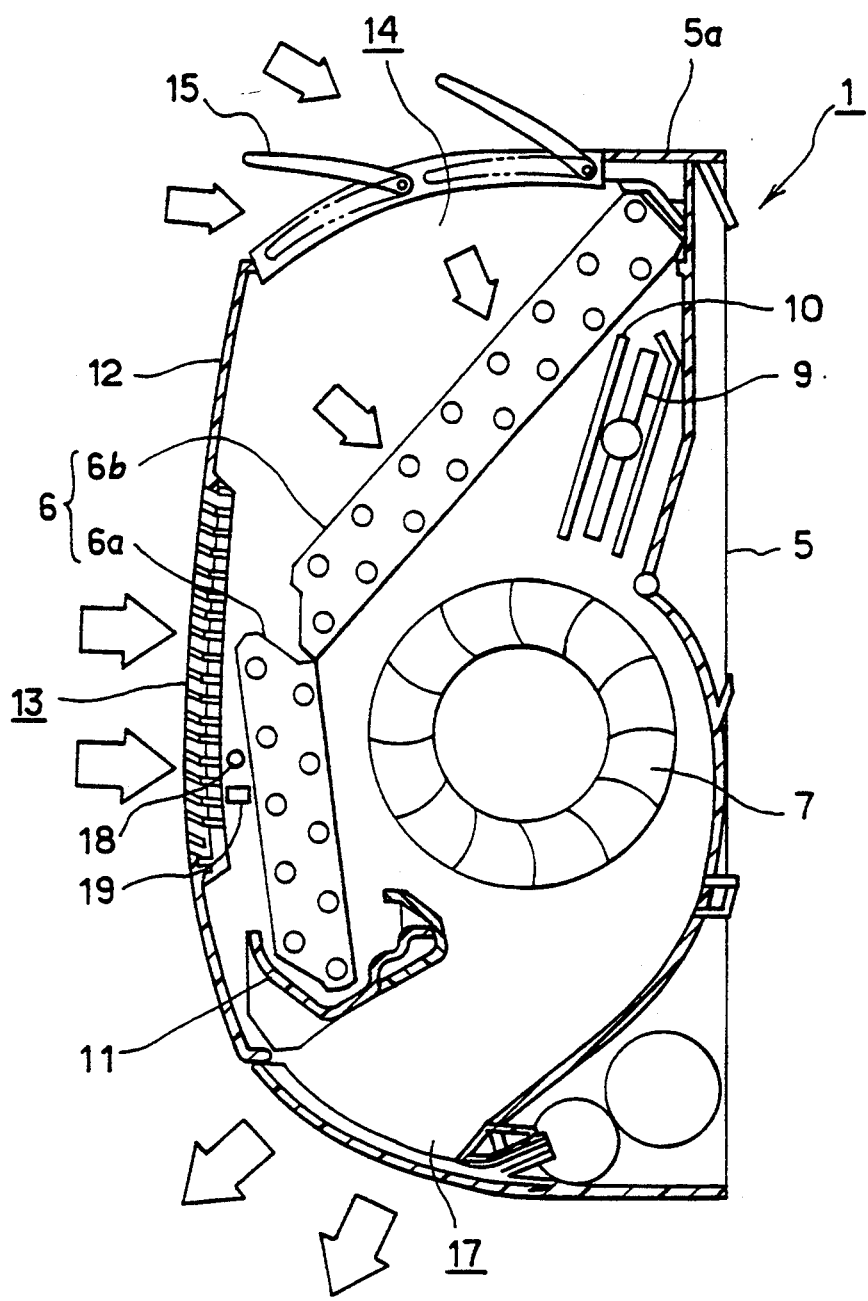
FIG. 2 is a sectional side view showing an indoor unit of the air conditioner shown in FIG. 1.
Figure 8:
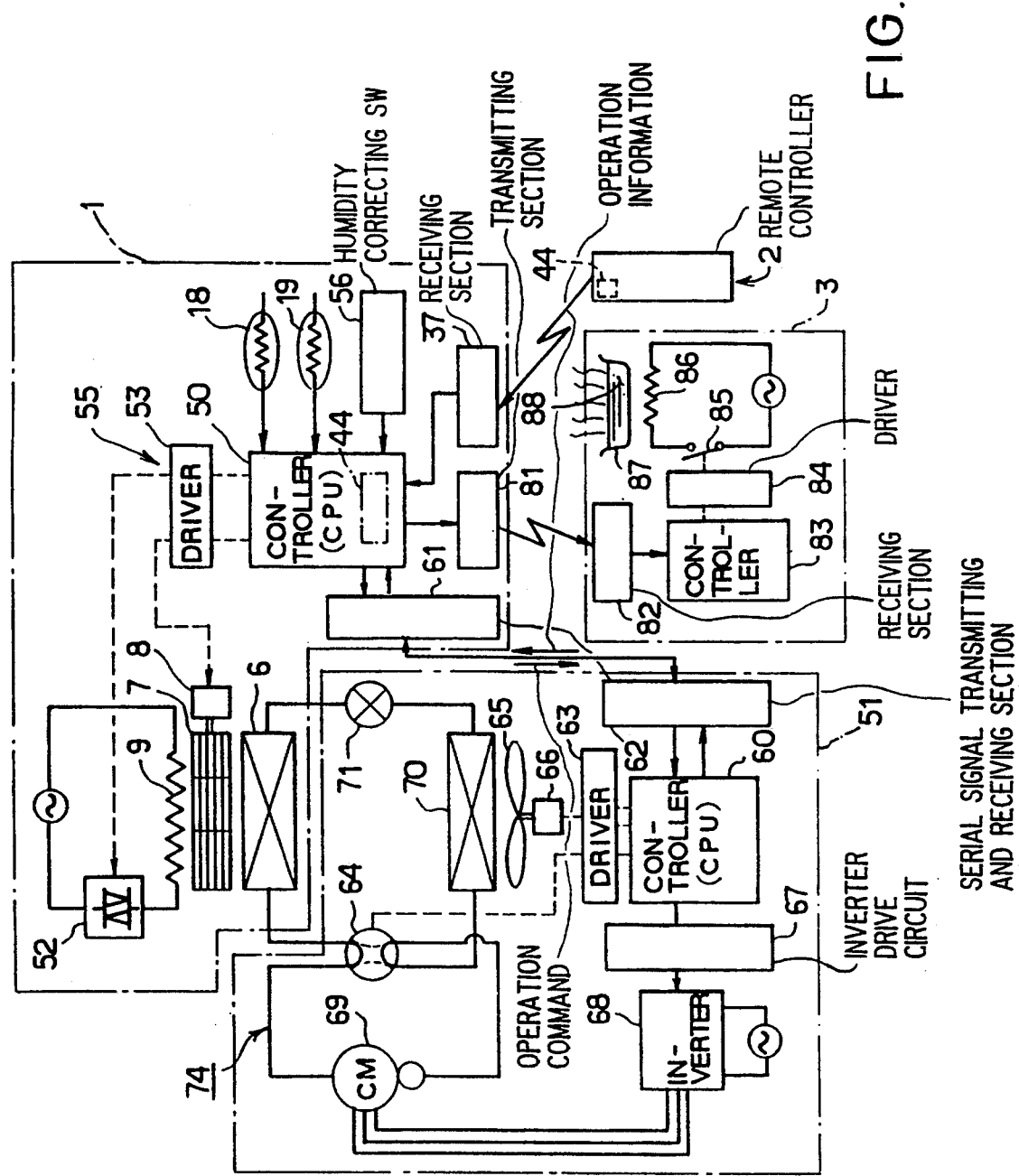
FIG. 8 is a control block diagram showing one example of the humidity control device of the air conditioner according to the present invention.

The body of the illustrated air conditioner 1 represents an indoor unit of a split-type air conditioner, and the indoor unit 1 has a body casing 5 as shown in FIG. 2. Within the body casing 5, an indoor side heat exchanger 6 and a cross flow fan 7 used as an indoor side fan are placed, and the cross flow fan 7 is driven and rotated by a fan motor 8 as shown in FIG. 8. A thermal heater 9 is arranged between the indoor side heat exchanger 6 and the cross flow fan 7. Reference numeral 10 indicates a thermal insulating plate.

The indoor side heat exchanger 6 comprises two heat exchanger elements 6a and 6b arranged in a flattened V shape, and a drain pan 11 is set under the indoor side heat exchanger 6. Drain filled up in the drain pan 11 is drained outside through a drain hose, which is not shown in the drawing.

The front of the body casing 5 is covered with a front panel 12 which is capable of opening and closing, and an air suction opening 13 is formed in the front panel 12. The air suction opening 13 faces opposite the indoor side heat exchanger 6, and an upper air suction opening 14 is also formed in an upper cabinet 5a of the body casing 5 as occasion demands. The upper air suction opening 14 may be opened and closed through the operation of a mechanism for opening and closing the suction opening.

An air blow-off port 17 is formed under the air suction opening 13 which is formed on the front part of the body casing 5, and cool air or warm air which is heat-exchanged in the indoor side heat exchanger 6 blows off from the air blow-off port 17. During the air blow-off, the blow-off direction of the air is adjusted by a louver, which is not shown in the drawing, disposed to the air blow-off portion.

On the upstream side of the indoor side heat exchanger 6, a temperature sensor 18 for detecting room temperature and a humidity sensor 19 for detecting humidity are disposed facing opposite to the air suction opening 13 formed on the front of the body casing 5.

Figure 3:
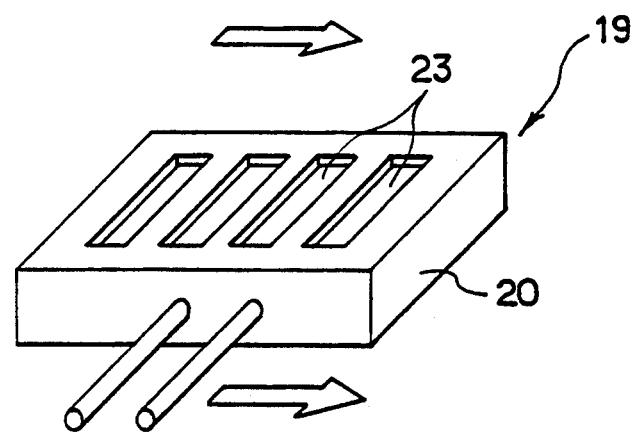
FIG. 3 is a schematic perspective view of a humidity sensor arranged in the indoor unit of the body of the air conditioner.
Figure 4:
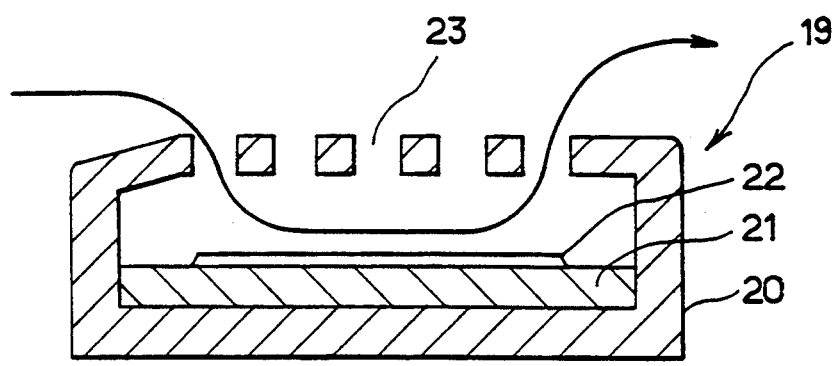
FIG. 4 is a sectional view of the above-mentioned humidity sensor of FIG. 3.
Figure 5:
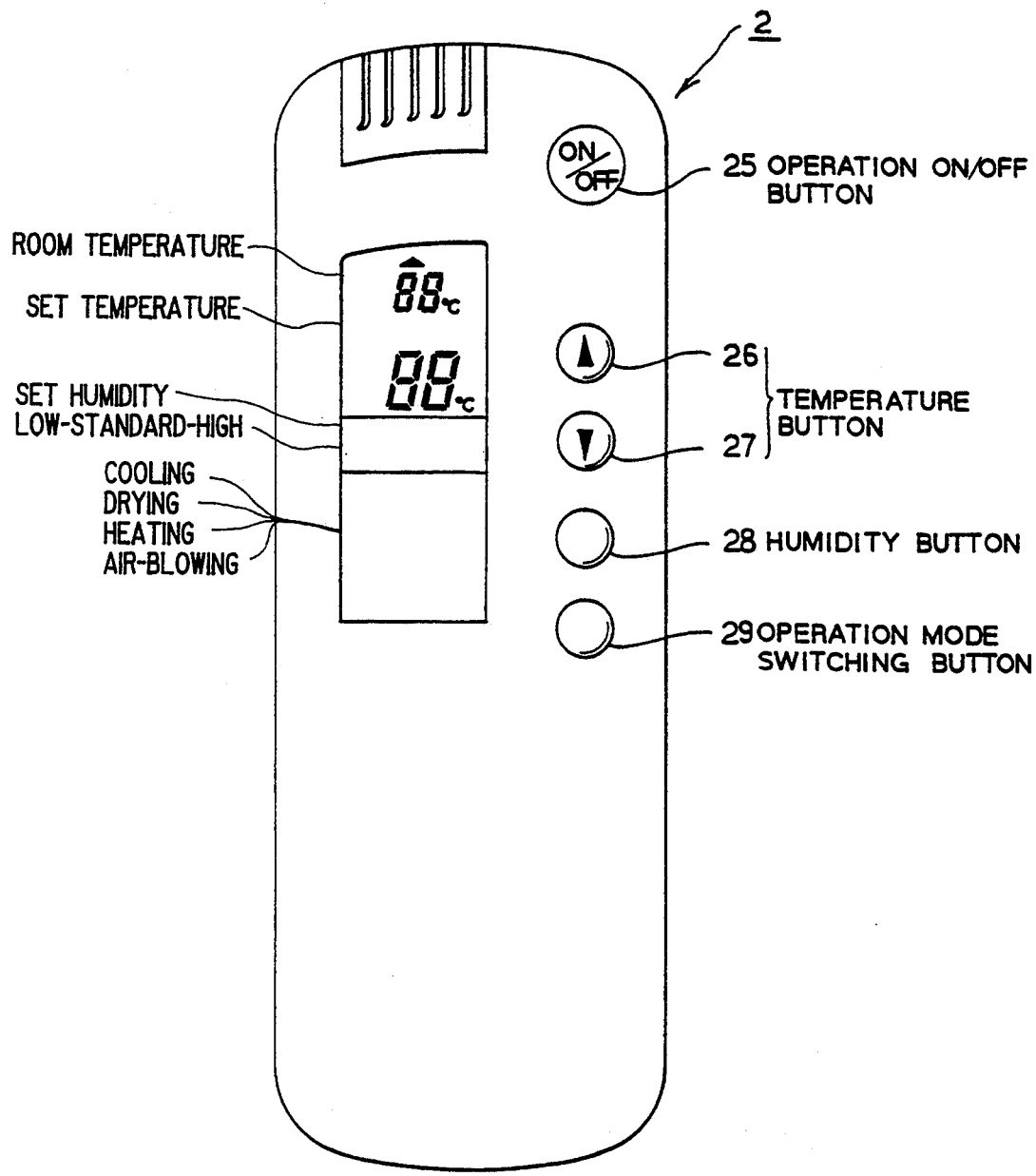
FIG. 5 is a view showing a remote controller of the air conditioner shown in FIG. 1.

Among these two sensors, as shown in FIGS. 3 and 4, the humidity sensor 19 is disposed such that a sensor case 20 is secured substantially perpendicular to the indoor side heat exchanger 6, thus preventing foreign matters such as dust from adhering to the sensor case 20.

In the humidity sensor 19, a pattern 22 functioning as a sensor element is placed on a base 21 which is accommodated within the sensor case 20, thereby detecting the humidity in a room. A plurality of slits 23 are also formed on the top of the sensor case 20 so that room air can be guided to the sensor pattern 22.

Further, the remote controller 2 for remotely controlling the operation of the air conditioner includes an operation on/off button 25, temperature buttons 26 and 27, a humidity button 28 and an operation mode switching button 29 in a remote controller case 24.

The two temperature buttons 26 and 27 are for raising and lowering temperatures, whereby they can set a room temperature such that a set temperature in a room rises (up) or lowers (down), for example, by 1° per one press of each temperature button.

On the other hand, the humidity button 28 is able to change and set the set humidity in a cyclic degree of "high", "standard" and "low" per one press of the button. The operation mode switching button 29 is also able to cyclically change and set the operation modes of cooling, drying, i.e. dehumidifying, heating and air-blowing operations.

Figure 6:
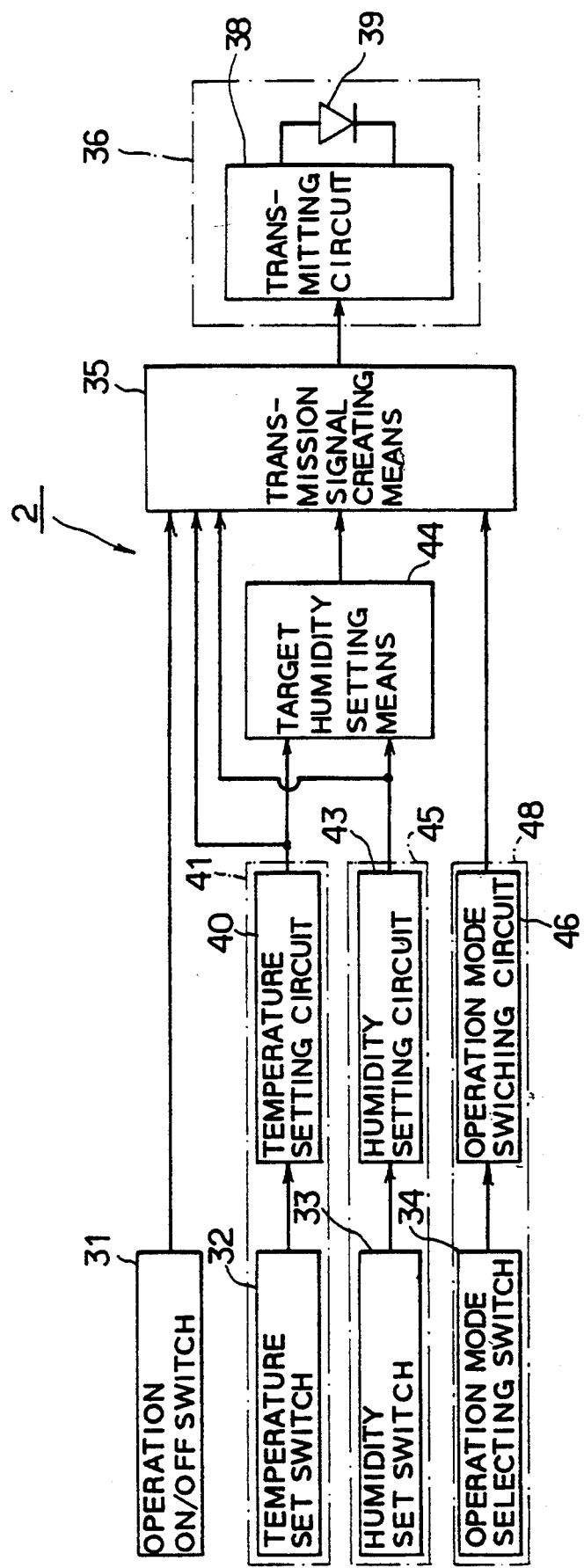
FIG. 6 is a control block diagram showing one example of a control block integrated into the remote controller of FIG. 5.

As shown in FIG. 6, the operation on/off button 25, the temperature buttons 26 and 27, the humidity button 28 and the operation mode switching button 29 are operatively connected for cooperation to an operation on/off switch 31, a humidity set switch 32, a humidity set switch 33 and an operation mode selecting switch 34, respectively. Among these switches, the operation on/off switch 31 is adapted to transmit an on/off operation signal from a transmitter 36 to a receiver 37 of the body of the air conditioner (the indoor unit) 1 via transmission signal creating means 35. The transmitter 36 is composed of a transmission circuit 38 and an infrared-ray emitting element, for example, light emitting diode LED 39, and the like.

The temperature set switch 32 is connected to the transmission signal creating means 35 via a temperature set circuit 40 and outputs a temperature set signal from the transmission signal creating means 35 to the receiver 37 via the transmitter 36. The temperature set circuit 40 forms temperature setting means 41 by the temperature buttons 26 and 27 and the temperature set switch 32.

The humidity set switch 33 is also connected to the transmission signal creating means 35 and target humidity setting means 44 via a humidity set circuit 43 and is adapted to transmit a humidity set signal from the transmission signal creating means 35. The humidity set circuit 43 forms humidity setting means 45 by the humidity button 28 and the humidity set switch 33.

Further, the operation mode selecting switch 34 is connected to the transmission signal creating means 35 via the operation mode changing circuit 46 and outputs an operation set signal from the transmission signal creating means 35. The operation mode changing circuit 46 forms an operation mode changing means 48 by the operation mode switching button 29 and the operation mode selecting switch 34.

The operation mode changing circuit 46 is also connected to the target humidity setting means 44. The target humidity setting means 44 sets the target humidity in an operation mode by a humidity set signal from the humidity set circuit 43 and an operation mode signal from the operation mode changing circuit 46, thus transmitting a set signal of the target humidity. The target humidity setting means 44 may be included in a controller 50 of the indoor unit 1, instead of being incorporated into the remote controller 2.

The target set humidity in an operation mode is represented by the relationship shown in FIG. 7. The target humidity setting means 44 of the remote controller 2 calculates the target set humidity in an operation mode based on the operation mode and a humidity set signal indicated by "high", "standard" and low", and inputs the target set humidity signal from the receiver 37 of the body of the indoor unit 1 to the controller 50 formed of a central processing unit CPU, a memory and the like, of the indoor unit 1 via the transmitter 36.

As shown in FIG. 8, a split-type air conditioner comprises the indoor unit 1 and an outdoor unit 51. The indoor side heat exchanger 6, the cross flow fan 7 used as an indoor side fan, and the thermal heater 9 are included within the indoor unit 1. The cross flow fan 7 is driven and rotated by the fan motor 8, and the thermal heater 9 is heated by a thyristor 52 such as a triode AC switch (TRIAC) or the like.

The thyristor 52 and the fan motor 8 are individually driven and controlled by a control signal from the indoor side controller 50 via a driver such as a relay driver and a power coupler driver or the like, and they form operation control means 55 for the thermal heater 9 and the cross flow fan 7.

An operation command signal is inputted from the remote controller 2 into the controller 50 via the receiver 37, and the room temperature and the humidity detected by the temperature sensor 18 and the humidity sensor 19 are converted into digital signals by an A/D converter, which is not shown in the drawing, which are inputted into the controller 50. A humidity correcting signal is also inputted from a humidity correcting switch 56 as a means for correcting the humidity. The humidity correcting switch 56 is adapted to correct the set humidity or the detected humidity through a manual operation.

Figure 9:
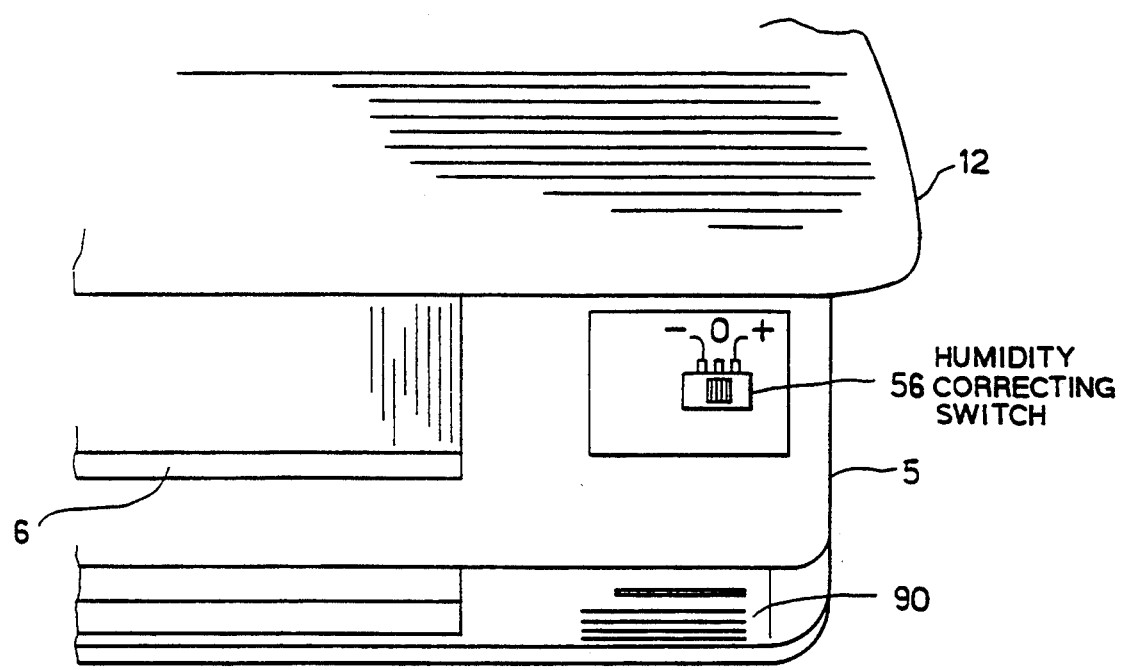
FIG. 9 is a view showing one example of fitting humidity correcting means which is fitted to the indoor unit of the air conditioner.

As illustrated in FIG. 9, the humidity correcting switch 56 is arranged on the front side portion of the body casing 5 and is exposed by opening the front panel 12. It is able to adjust the humidity on the sides of plus (+) and minus (−) through manual operation. The humidity correcting switch 56 is for correcting differences of sensible temperatures of individuals.

As illustrated in FIG. 8, operation signals of operation commands and operation information are exchanged between the controller 50 of the indoor unit 1 and the controller 60 of the outdoor unit 51 via serial signal transmitting and receiving sections 61 and 62.

The outdoor side controller 60 controls the driving of a four-direction valve 64 and a fan motor 66 of an outdoor side fan 65 via a driver 63 such as a relay driver and a power coupler driver, or the like, and also controls the driving of an inverter 68 via an inverter driving circuit 67. The operation frequency of a compressor 69 is controlled by controlling the driving of the inverter 68, and the compressor 69 is operatively controlled.

The compressor 69, the four-direction valve 64, an outdoor side heat exchanger 70 and an expansion valve 71 functioning as a pressure reducing mechanism are accommodated in the outdoor unit 51. The compressor 60, the four-direction valve 64, the outdoor side heat exchanger 70 and the expansion valve 71 are connected to the indoor side heat exchanger 6 accommodated in the indoor unit 1 and they compose a refrigerating cycle 74 for circulating refrigerant. The refrigerating cycle 74 switches the four-direction valve 64, thereby carrying out heating, cooling and dehumidifying, i.e. drying, operations.

Figure 10:
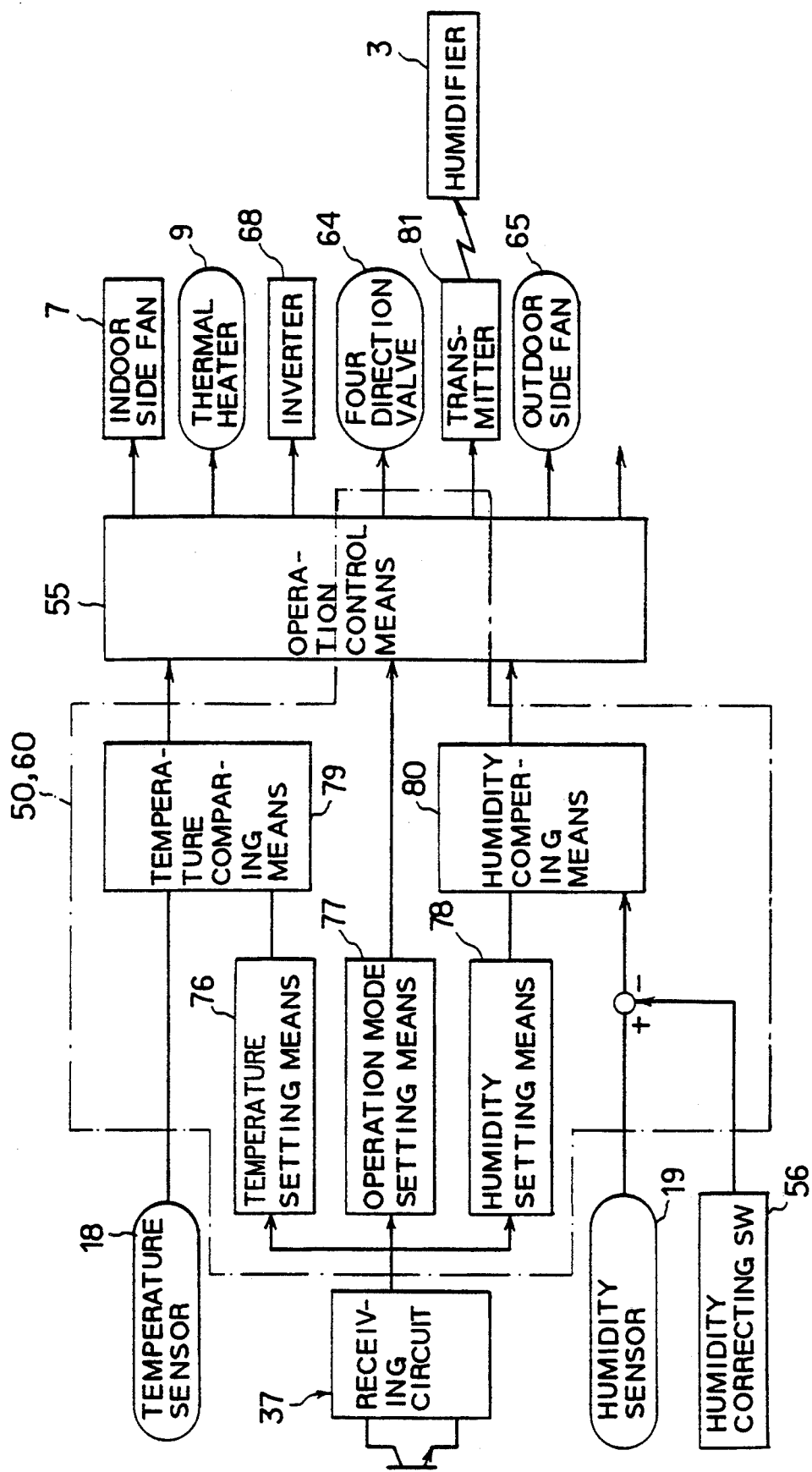
FIG. 10 is a view showing one example of a control block included in the controller of the air conditioner.

The air conditioner has a control block shown in FIG. 10. The controllers 50 and 60 of the air conditioner integrated into the indoor unit 1 and the outdoor unit 50 are adapted to input the signals which are inputted via the receiver 37 into temperature setting means 76, operation mode setting means 77 and humidity setting means 78.

Among these signals, the set temperature signal which is inputted into the temperature setting means 76 is compared with a room temperature detected by the temperature sensor 18 by employing temperature comparing means 79, and the comparison results are then outputted to the operation control means 55. The operation control means 55 are composed of, for example, the driver 53, the fan motor 8 and the thyristor 52 of the indoor unit 1 and the driver 63, the fan motor 66 and the inverter drive circuit 67 of the outdoor unit 51, and the like.

The operation mode set signals representing, for example, the cooling, drying, heating and air-blowing conditions which are inputted into the operation mode setting means 77 of the controllers 50 and 60 are inputted into the operation control means 55, thus switching the four-direction valve 64 according to the operation modes and heating the thermal heater 9, and the like.

Furthermore, the target humidity set signal which is outputted from the humidity setting means 78 is inputted into humidity comparing means 80 where it is compared with the humidity detected by the humidity sensor 19, and the resulting compared signal is inputted into the operation control means 55. Thus, in response to the compared signal, the operation control means 55 transmits a signal to operate the humidifier 3 from a transmitter for controlling the operation of the humidifier 81 during the heating operation.

The humidity detected by the humidity sensor 19 is calibrated by a humidity correcting signal from the humidity correcting switch 56 operated according to the differences of the sensible temperatures of individuals. The humidity correcting switch 56 may calibrate the set humidity from the humidity setting means 78.

The humidifier transmitter 81 such as the infrared-ray emitting element, such as an LED for controlling the operation of the heating-type humidifier 3, is included in the indoor unit 1. An operation control signal from the transmitter 81 is inputted into a controller 83 of the humidifier 3 via a transmitter 82 of the humidifier 3 which is set away from the indoor unit 1.

Referring again to FIG. 8, the inputted operation control signal is signal-processed by the controller 83 and controls the opening and closing of a switch 85 via the driver 84, such as a relay driver or the like. The heating of the humidifying heater 86 is controlled by the opening and closing of the switch 85, thereby controlling the evaporation or humidification of water 88 which is accommodated in an evaporation pan 87. The humidifier 3 may be an ultrasonic-type humidifier.

The humidifier 3 is adapted to control the humidity in the room even during the heating operation by being operationally connected to the body of the air conditioner 1, and the operation of the humidifier 3 is controlled. The transmitter 81 is attached to the humidifier 3 during sale.

The transmitter 81 is attached to the body of the air conditioner 1 will now be discussed and shown by the processes in FIGS. 11 to 15.

Figure 11:
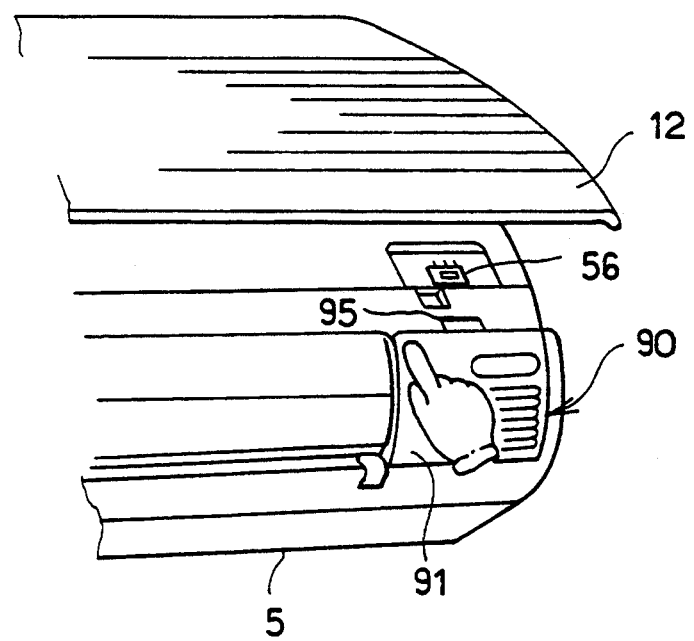
FIG. 11 is a view explaining a process of detaching a body display portion included in the indoor unit of the air conditioner.
Figure 12:
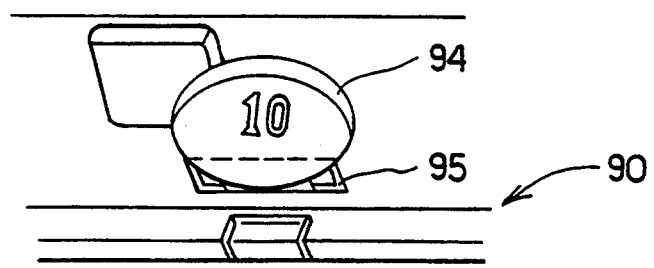
FIG. 12 is a view explaining an operation of detaching a display cover from the body display portion of the indoor unit.

As shown in FIG. 11, a body display portion 90 is formed, for example, on the bottom of the front side of the body of the indoor unit 1, and a display cover 91 for the body display portion 90 is detachably fixed. The display cover 91 is attached to the body display portion 90 by a plurality of fitting legs 92 and a lock claw 93. When the display cover 91 is detached from the body display portion 90, for example, a coin 94 may be inserted from a slot of a limited size 95 so as to allow the lock claw 93 to be released as shown in FIG. 12, thereby detaching the display cover 91 from the body display portion 90 as shown in FIG. 13.

An accommodating hole 96 for the humidifier transmitter 81 is formed within the body display 90 beforehand, and a connector terminal 98 connected to a cord 97 is hooked on a plate-shaped holder 99 near the display cover 91 and secured thereto. The connector terminal 98 can be easily detached because it is secured to the holder 99.

Figure 13:
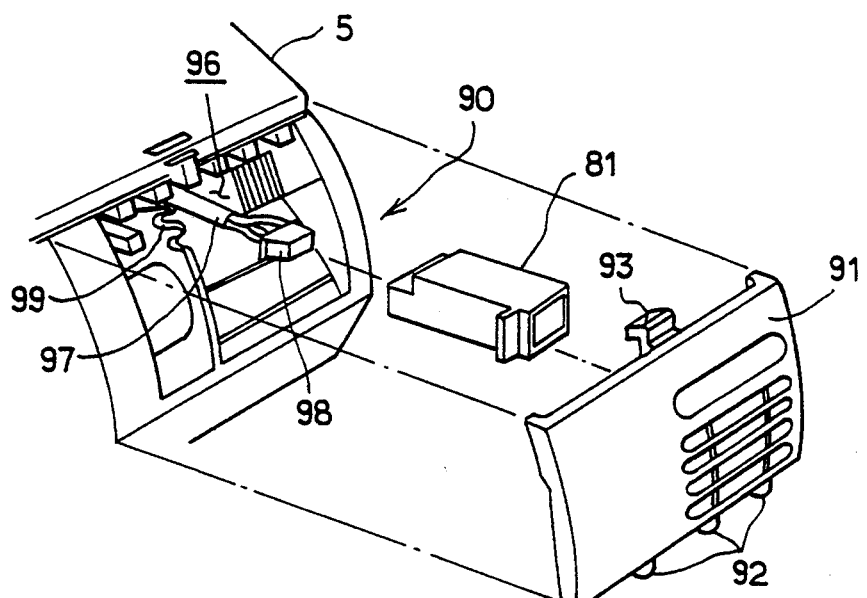
FIG. 13 is a perspective view showing the display cover being detached from the body display portion.
Figure 14:
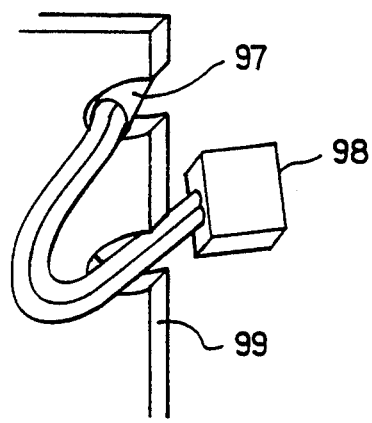
FIG. 14 is a view showing a connector terminal being accommodated in the body display portion.

The connector terminal 98 is detached and the transmitter 81 for controlling the humidifier is connected to the connector terminal 98, as illustrated in FIG. 13. The transmitter 81 connected to the connector terminal 98 is inserted into the accommodating hole 96 and is accommodated therein.

Figure 15:
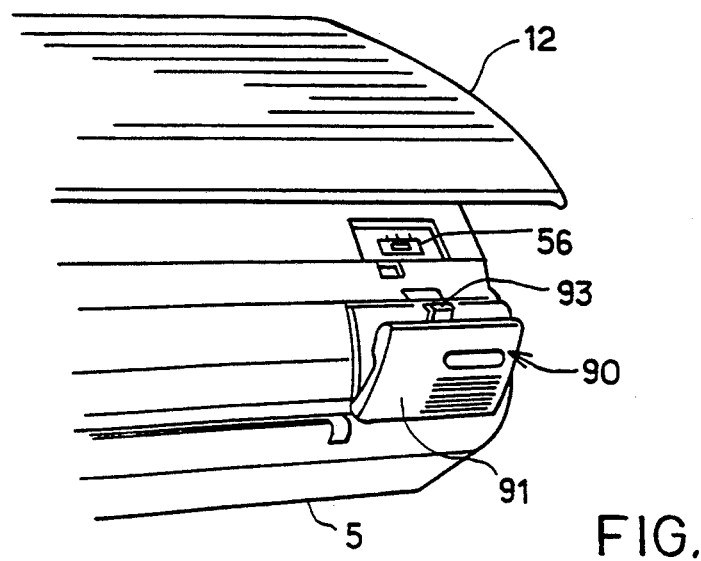
FIG. 15 is a perspective view showing the display cover being attached to the body display portion.

After the transmitter 81 is accommodated in the accommodating hole 96, the display cover 91 is attached to the body display portion 90 by using a plurality of fixing legs 92 and the lock claw 93, as shown in FIG. 15, thus completing the body display 90. Further, the front panel 12 is closed, and the attachment of the transmitter 81 is completed.

After the transmitter 81 is attached to the body of the air conditioner 1, the humidifier 3 is prepared for use.

Water is put into the humidifier 3 and a power plug is inserted into a socket. The power switch is turned on and a selecting switch, not shown, of the humidifier 3 is operated, and the humidifier 3 is set such that it is operatively connected to the air conditioner.

The air conditioner of the present invention will be operated in the following manner.

Figure 16:
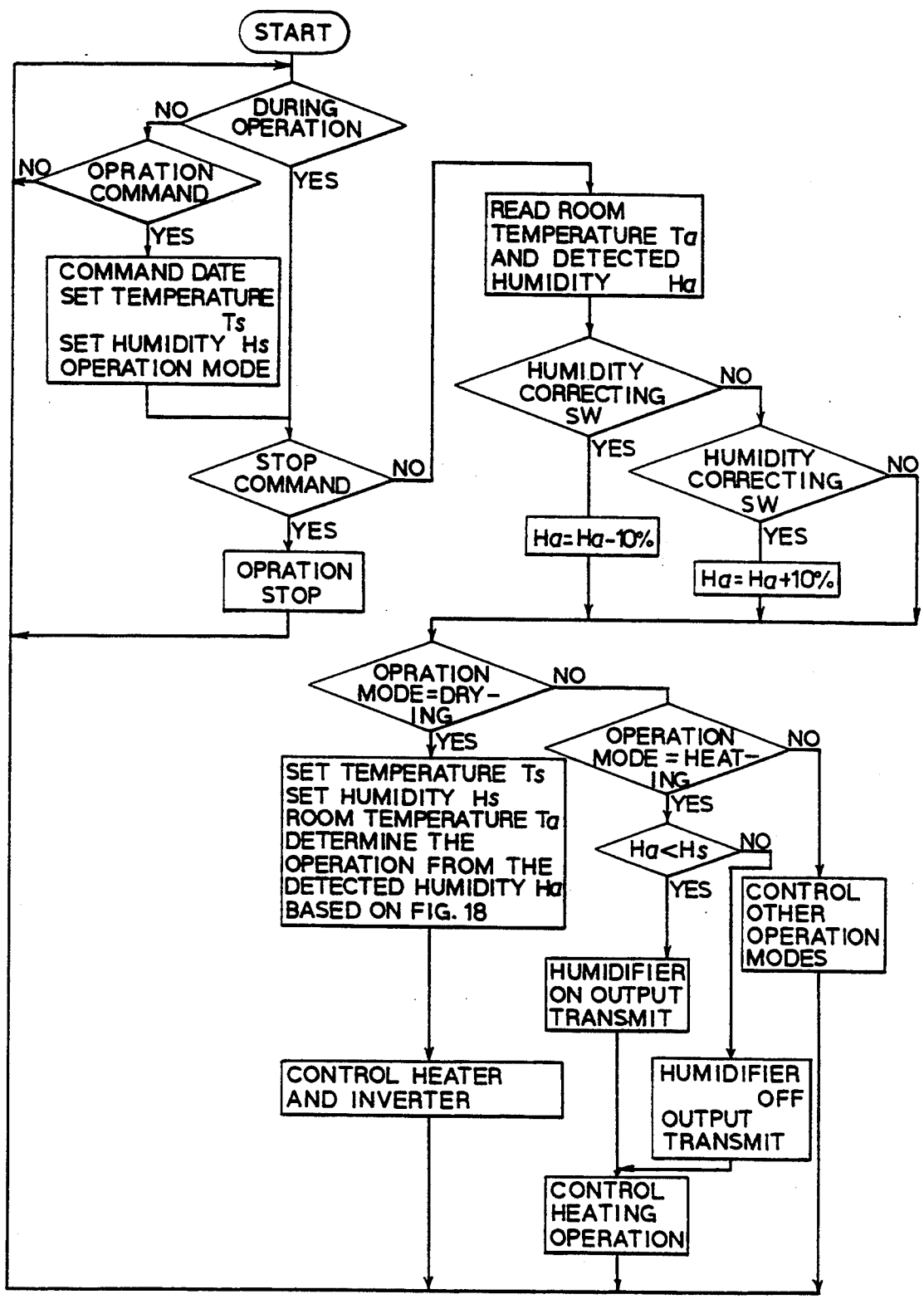
FIG. 16 is a flowchart showing the flow of the operation of the air conditioner.

The operation on/off button 25 of the remote controller 2 is pressed so that an operation mode is selected from among heating, cooling, drying, and air-blowing operation modes, according to the operation command data (set temperature Ts, set humidity Hs) stored in operation command data storing means, not shown, thus starting the operation, as shown in FIG. 16. The driving of the compressor 69, the four-direction valve 64, the indoor side fan 7, the outdoor side fan 65, the thermal heater 9 and the humidifier 3 of the refrigerating cycle 74 in the air conditioner are controlled by the operation control means 55 according to the operations of the operation modes.

The operation modes are selected in accordance with the flowchart shown in FIG. 16, and accordingly, the heating, cooling, drying and air-blowing are performed, thereby conditioning the by the air conditioner. According to the differences of the sensible temperatures of the individuals, the humidity detected by the humidity sensor 19 or the set humidity may be corrected by the humidity correcting switch 56 as a means of correcting the humidity as occasion demands. The correction of the detected humidity or the set humidity is performed manually by correcting the detected humidity, for example, by approximately 10% or may be several % according to the differences of the sensible temperatures of individuals.

Figure 17:
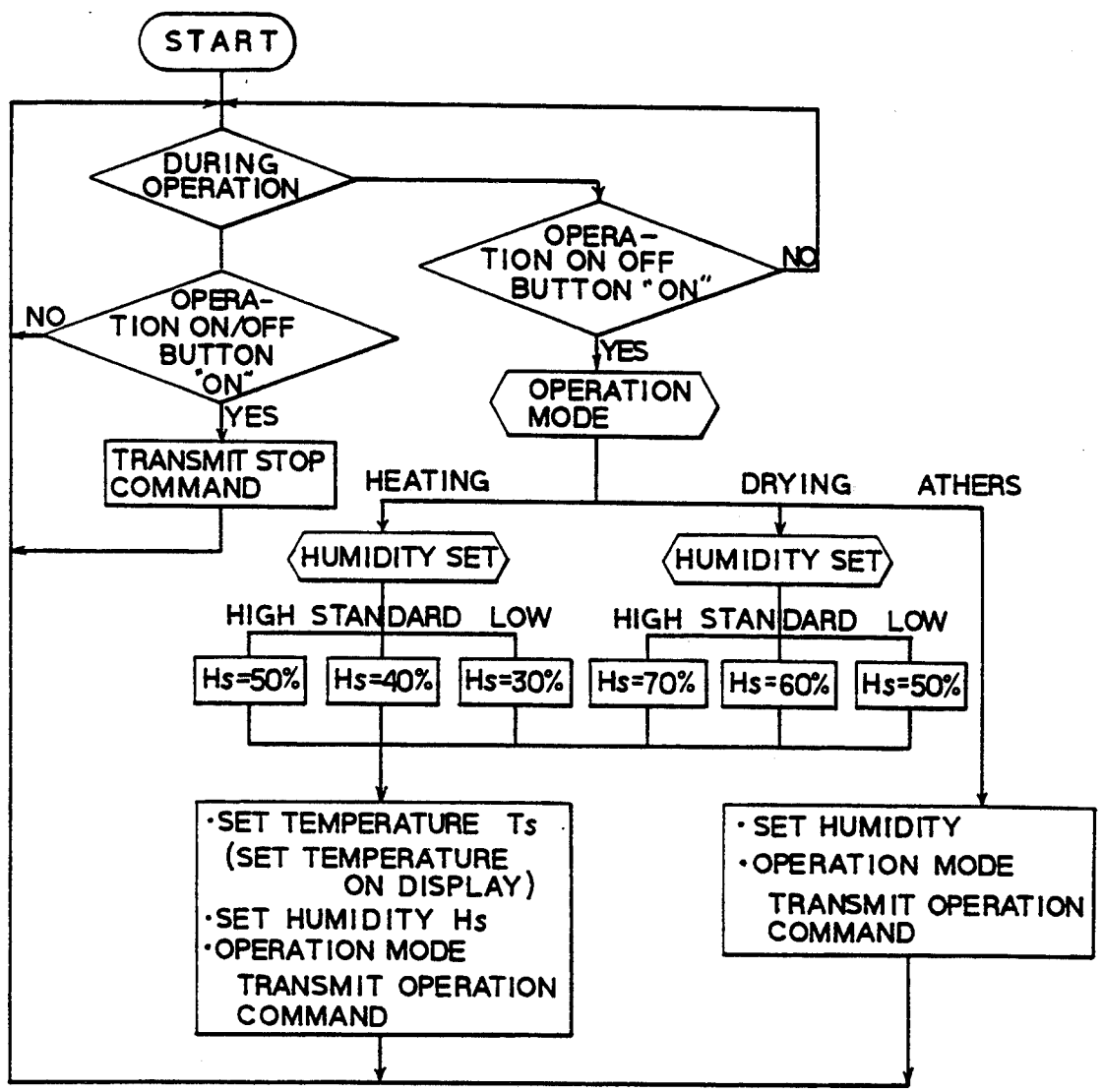
FIG. 17 is a flowchart showing the flow of the operation of the remote controller.

The operation modes of the air conditioner are also selected by pressing the operation mode button 29 of the remote controller 2, as shown in FIG. 17. The target humidity in the selected operation mode is set by pressing the humidity button, and the temperature is set by pressing the temperature buttons 26 and 27.

The drying operation is selected by the operation mode button 29 of the remote controller 2 and the humidity button 28 is pressed so that the target set humidity Hs is set by the target humidity setting means 44 within the remote controller 2. When the target set temperature Ts is selected by the temperature buttons 26 and 27, the operations of the refrigerating cycle 74, i.e. the operation of the compressor 69, and the thermal heater 9 integrated into the indoor unit 1 in the air conditioner are controlled by the indoor side controller 50 and the outdoor side controller 60. When the drying air blows from the air blow-off port 17 in the body of the indoor unit 1, the inverter 68 for driving the compressor and the thermal heater 9 are controlled such that the room temperature and the humidity in the room are placed within the target control region A shown in FIG. 18.

Figure 18:
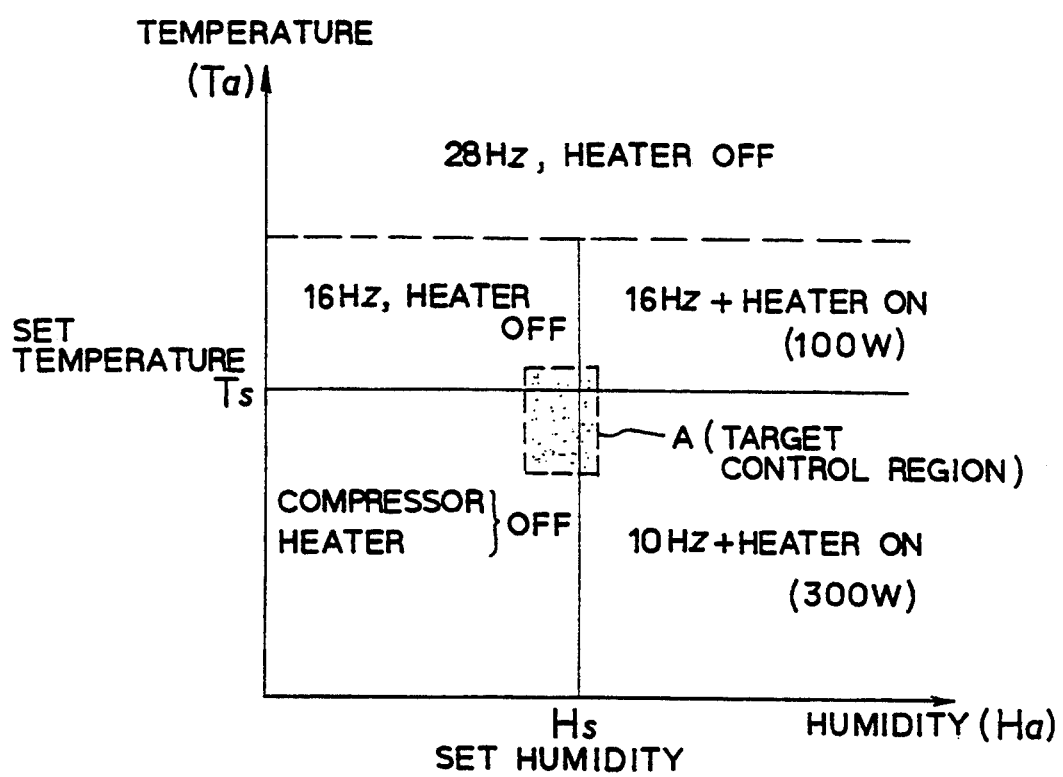
FIG. 18 is a control table explaining a targeted control region during the drying operation by the air conditioner.

More specifically, during the drying operation, when the room temperature Ta and the humidity Ha detected by the temperature sensor 18 and the humidity sensor 19 are lower than the set temperature Ts and the set humidity Hs, as illustrated in FIG. 18, the compressor 69 and the thermal heater 9 are not operated and the air conditioner remains inoperative.

When the room temperature Ta is the same as, or higher than, the set temperature Ts and the detected humidity Ha is the same as, or lower than, the set humidity, the compressor 69 renders the cooling operation by the inverter 68, for example, at 16 Hz, and the thermal heater 9 is set to OFF.

When the room temperature Ta is the same as, or lower than, the set temperature Ts, and the detected humidity Ha is the same as, or higher than, the set humidity Hs, the compressor 69 is operated, for example, at 10 Hz, and the thermal heater 9 is heated by the thyristor 52, for example, at 300 W, thus performing the drying operation.

When the room temperature Ta and the detected humidity Ha are higher than the set temperature Ts and the set humidity Hs, the compressor 69 is operated, for example, at 16 Hz, and the thermal heater 9 is heated by the thyristor 52, for example, at 100 W.

When the room temperature Ta is much higher than the set temperature Ts, the compressor 69 carries out the cooling operation, for example, at 28 Hz, regardless of the detected humidity Ha.

As stated above, when an operation mode of the air conditioner is selected for the drying operation, the air conditioner performs the drying operation based on FIG. 18 according to the flowchart of FIG. 16.

Figure 19:
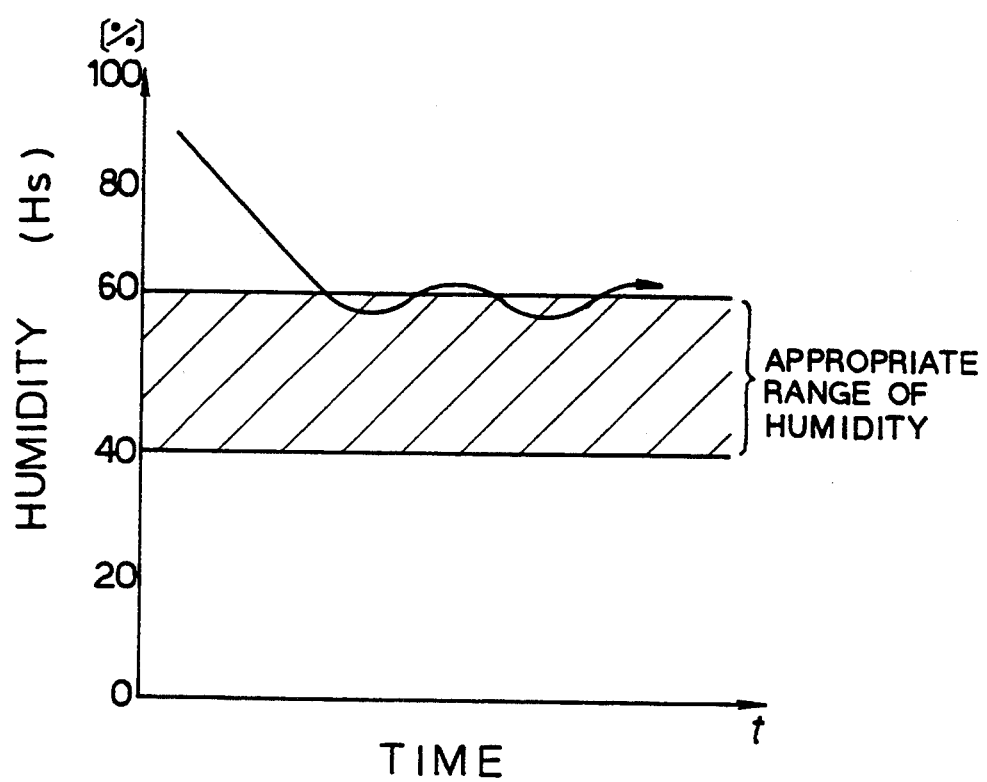
FIG. 19 is a graph showing the change of time relative to the humidity in a room to be controlled during the drying operation by the air conditioner.

When the drying operation continues in the air conditioner, the humidity in the room comes gradually close to the set humidity Hs (the set humidity 60% when the humidity button 28 selects the standard, i.e. intermediate, humidity), and the target humidity is kept within the appropriate range of the humidity shown in FIG. 19, thus creating a comfortable atmosphere condition.

When the heating operation is selected by the operation mode switching button 29 of the remote controller 2 as shown in FIG. 17, and the humidity controlling (humidifying) is also executed by operating the humidity button 28 even during the heating operation, the set humidity Hs (the set humidity Hs, for example, 40%, is different from the set humidity, 60%, during the drying operation) and the detected humidity Ha are compared by the humidity comparing means 80 of the controller 50 in the indoor unit 1. During this comparison, the humidity correcting signal from the humidity correcting switch 56 is also taken into account.

When the set humidity Hs is higher than the detected humidity Ha, a command signal to operate the humidifier is outputted from the operation control means 55 to the humidifier transmitter 81, thereby operating the humidifier 3.

Figure 20:
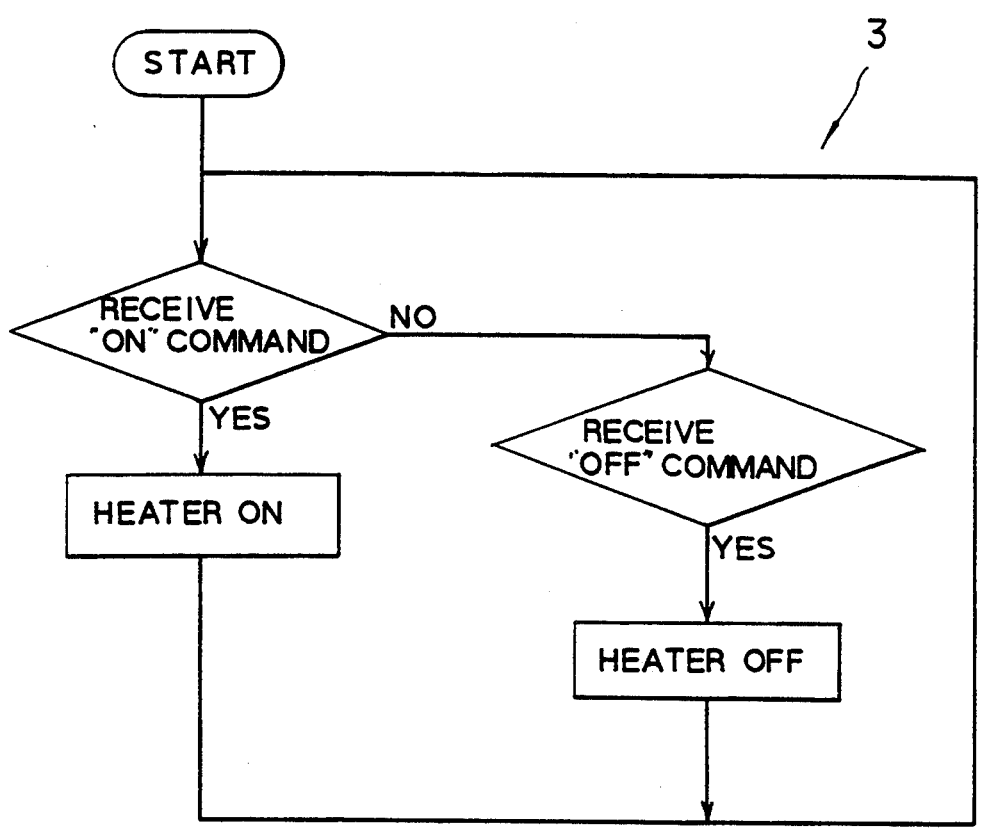
FIG. 20 is a flowchart showing the operation control of a humidifier.

The humidifier 3 is driven according to the flowchart shown in FIG. 20. When an operation command signal (an ON command signal) is inputted into the receiver 82 of the humidifier 3, the controller 83 closes the switch 85 via the driver 84 so that the humidifying heater 86 is heated and the water 88 in the evaporation pan 87 is evaporated, thus humidifying the room.

If the detected humidity Ha detected by the humidity sensor 19 comes to higher than the set humidity Hs because of the humidification of the room, an operation stop signal to turn off the humidifier is inputted into the controller 83 of the humidifier 3, and the controller 83 turns off the switch 85, thereby stopping the heating by the humidifying heater 86, as illustrated in FIG. 16.

Figure 21:
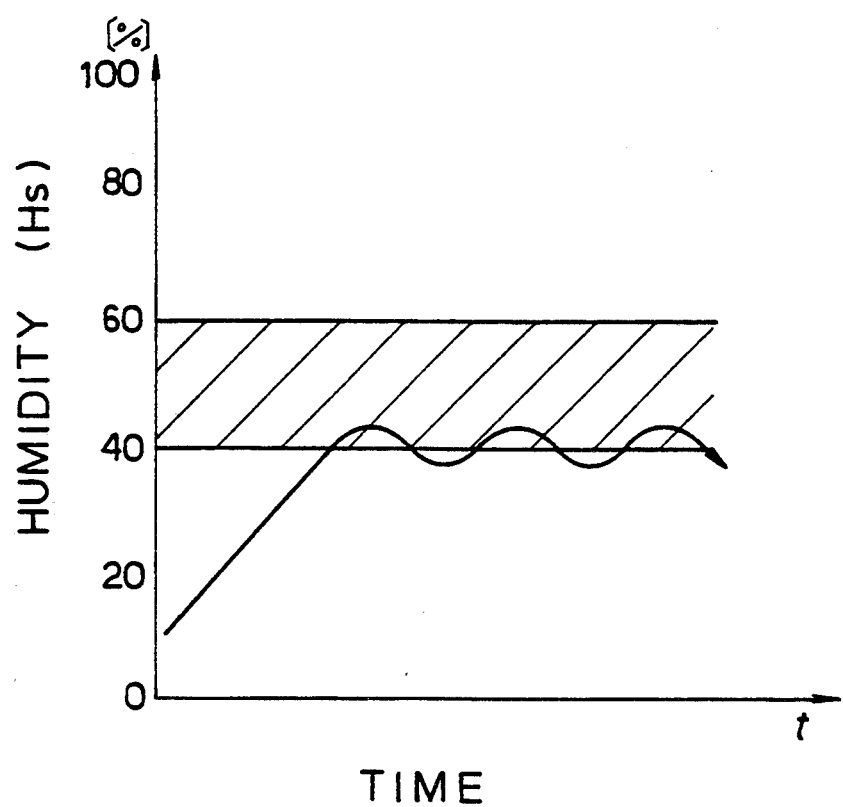
FIG. 21 is a graph showing the change of time relative to the humidity in a room to be controlled during the heating operation by the air conditioner.

Based on the humidity control during the heating operation, as illustrated in FIG. 21, the humidity in the room comes gradually close to the set humidity Hs (when the standard is chosen, Hs=40%) and it is kept within the appropriate region of the humidity of the set humidity Hs.

It should be noted that the cooling operation and the air-blowing operation do not differ from the cooling operation and the air-blowing operation of conventional air conditioners.

In this air conditioner, the humidity control can be performed even during the heating operation. Further, in this humidity control during the drying operation and the heating operation, even if the same "standard" set humidity is selected by operating the humidity button 28, the target set humidity is different from each other. More specifically, even if the same "standard" set humidity is selected by the humidity button 28 during the drying operation and the heating operation, the target humidity is controlled within the appropriate range of the humidity at a slightly higher humidity (the set humidity 60%) during the drying operation and at a slightly lower humidity (the set humidity 40%) during the heating operation. Thus, the air conditioner can be operated without any waste, thus leading to energy-saving and further creating a comfortable atmosphere condition.

The split-type air conditioner has been described in the embodiment of the present invention. However, the present invention is not necessarily limited to a split-type one, but a body of the air conditioner of a type mounted on a wall, on a floor, in a ceiling and on a window may be adapted. For example, if the body of the air conditioner is of a type mounted in the ceiling, the humidifier may be of a type mounted on the floor, or in the floor, or in the side wall, or the other types, and many kinds of modifications may be adapted.

As described above, in the humidity control device of the air conditioner according to the present invention, the set humidity during the drying operation and that of the heating operation can be altered according to the operation modes by using the target humidity setting means, and the target set humidity during the heating operation can be lowered within the appropriate range of the humidity, thus creating a comfortable atmosphere condition in a room according to the operation modes and achieving energy-saving of the air conditioning operation.

Further, during the heating operation, when the humidity detected by the humidity sensor is lower than the set humidity by the humidity setting means, the humidity control device of the air conditioner is adapted to control the humidity by operating the humidifier, thus creating a comfortable atmosphere within the appropriate range of the humidity even during the heating operation.

Since the humidifier is placed separately from the body of the air conditioner, the flexibility of placement of the humidifier can be improved. Even if the humidifier is placed separately, it is operatively connected for cooperation to the controller of the body of the air conditioner and is controlled integrally therewith. Consequently, it is not necessary to control the humidifier at a different place and time separately from that of the air conditioner, thus enhancing easy handling and convenience.

Further, since the transmitter for controlling the humidifier can be disconnectably attached to the body of the air conditioner, the humidifier can be attached to the transmitter for sale, thus improving the flexibility of sales of local air-conditioning.

Furthermore, since the set humidity by the humidity setting means can be set at a plurality of settings, finely adjusted humidity settings can be performed according to the operation modes, thus obtaining a comfortable atmosphere condition in the room.

Still furthermore, since the humidity correcting means for correcting the set humidity or the detected humidity is arranged in the body of the air conditioner, the differences of the sensible temperatures of individuals can be adjusted, thus enabling personal humidity control.

The humidity sensor for detecting the humidity in the room is placed on the upstream side of the indoor side heat exchanger in the body of the air conditioner, parallel to the flow-in air, thus effectively preventing foreign matters such as dust or the like from adhering to the humidity sensor.

According to the air conditioner of the present invention, the remote controller controls the operation of the body of the air conditioner for conditioning air in the room, whereby the controller of the air conditioner body can control the operation of the humidifier which is separately placed from the body of the air conditioner during the heating operation. Hence, the humidity control can be performed by the operation of the remote controller not only during the drying operation but also during the heating operation according to the operation modes.

What is claimed is:

1. A humidity control device of an air conditioner having an air conditioner body and being capable of controlling a humidity as well as conditioning air during heating, drying and like operations, said humidity control device comprising:

means for detecting a humidity in a room to be subjected to air conditioning operation;

means for manually setting a humidity in the room in a plurality of operation setting modes;

a target humidity setting means for setting a target humidity in accordance with operation modes of the humidity manually setting means;

control means for comparing the humidity detected by the humidity detecting means with the humidity set by the humidity manually setting means and controlling the compared humidity.

2. A humidity control device of an air conditioner according to claim 1, further comprising a humidifier responsive to the control means and adapted to receive an operation command signal from the control means in accordance with detected humidity and temperature in the room.

3. A humidity control device of an air conditioner according to claim 2, further comprising a heater, means for detection a temperature in the room and an inverter which operate in association with the humidifier.

4. A humidity control device of an air conditioner according to claim 3, wherein said heater and said inverter are not operated at a time when the detected room humidity and room temperature are below the set humidity and temperature to maintain operation stop condition of the air conditioner.

5. A humidity control device of an air conditioner according to claim 3, wherein said inverter is operated and said heater is not operated at a time when the detected room humidity is below the set humidity and the detected room temperature is above the set temperature to thereby carry out the drying operation.

6. A humidity control device of an air conditioner according to claim 3, wherein said heater and inverter are operated in the drying operation mode at a time when the detected room humidity is above the set humidity and the detected room temperature is below the set humidity.

7. A humidity control device of an air conditioner according to claim 3, wherein said inverter and heater are operated in the heating operation mode at a time when the detected room humidity and room temperature are above the set humidity and temperature.

8. A humidity control device of an air conditioner according to claim 2, wherein said humidity detecting means and said control means are arranged in the air conditioner body, said humidifier is arranged independently from the air conditioner body, and wherein said control means transmits a humidifier control signal to the humidifier through a wireless transmission.

9. A humidity control device of an air conditioner according to claim 2, further comprising means for transmitting the humidifier control signal to the air conditioner body, said transmitting means is provided for the air conditioner body to be detachable.

10. A humidity control device of an air conditioner according to claim 2, further comprising a humidity correcting means provided for the air conditioner body and adapted to correct the set humidity or the detected humidity.

11. A humidity control device of an air conditioner according to claim 2, further comprising a controller for controlling air conditioning in the air conditioner body and a remote controller for controlling the operation of the controller and wherein the humidifier into which a humidifier control signal is inputted from the controller through a wireless transmission is arranged independently from the air conditioner body to thereby control the humidity in the room during the heating operation.

12. A humidity control device of an air conditioner according to claim 11, wherein said target humidity setting means is arranged in the remote controller.

13. A humidity control device of an air conditioner according to claim 11, wherein said target humidity setting means is arranged in the air conditioner body in association with the controller.

14. A humidity control device of an air conditioner according to claim 2, further comprising a switching circuit means operatively connected to the target humidity setting means and adapted to switch the operation modes of the air conditioner.

15. A humidity control device of an air conditioner according to claim 2, wherein said air conditioner body includes an indoor unit installed in the room, an indoor side heat exchanger and an indoor side fan are accommodated in the indoor unit, the humidity detecting means is disposed on an upstream side of the indoor side heat exchanger in parallel to an air flow flown into the indoor side heat exchanger.

16. A humidity control device of an air conditioner having an air conditioner body and being capable of controlling a humidity as well as conditioning air during heating, drying and like operation modes, said humidity control device comprising:

a target humidity setting means for setting a target humidity in accordance with operation modes of the air conditioner, the target humidity during the heating and drying operation modes being set so as to be different from each other;

a humidity detecting means for detecting a humidity in a room to be subjected to air conditioning operation; and a control means for comparing the humidity in the room with the target humidity and controlling the humidity in the room.

17. A humidity control device of an air conditioner according to claim 16, further comprising means for manually setting a humidity in the room in a plurality of operation setting modes and means for changing the target humidity in accordance with the humidity set manually.

18. A humidity control device of an air conditioner according to claim 16, wherein the control means includes means for transmitting an operation command signal in accordance with the compared humidity between the room humidity and the target humidity, and the humidity control device further comprising a humidifier responsive to the control means and adapted to receive an operation command signal from the control means.

19. A humidity control device of an air conditioner according to claim 16, further comprising a heater, means for detecting a temperature in the room and an inverter which operate in association with the heater.

20. A humidity control device of an air conditioner according to claim 19, wherein said heater and said inverter are not operated at a time when the detected room humidity and the detected room temperature are below the target humidity and below the temperature to maintain an operation stop condition of the air conditioner, respectively.

21. A humidity control device of an air conditioner according to claim 19, wherein said inverter is operated and said heater is not operated at a time when the detected room humidity is below the target humidity and the detected room temperature is above a set temperature to thereby carry out the drying operation.

22. A humidity control device of an air conditioner according to claim 19, wherein said heater and inverter are both operated in the drying operation mode at a time when the detected room humidity is above the target humidity and the detected room temperature is below a set temperature.

23. A humidity control device of an air conditioner according to claim 19, wherein said inverter and heater are operated in the drying operation mode at a time when the detected room humidity and the detected room temperature are above the target humidity and a set temperature, respectively.

24. A humidity control device of an air conditioner according to claim 18, wherein said humidity detecting means and said control means are arranged in the air conditioner body, said humidifier being arranged independently from the air conditioner body and wherein said control means transmits a humidifier control signal to the humidifier through a wireless transmission.

25. A humidity control device of an air conditioner according to claim 24, further comprising transmitting means for transmitting the humidifier control signal to the humidifier, said transmitting means detachably connected to the air conditioner body.

26. A humidity control device of an air conditioner according to claim 16, further comprising a humidity correcting means provided with the air conditioner body and adapted to correct the target humidity or the detected humidity.

27. A humidity control device of a air conditioner according to claim 18, further comprising a controller for controlling air conditioning in the air conditioner body and a remote controller for controlling the operation of the controller and wherein the humidifier, into which an operation command signal is inputted from the controller through a wireless transmission, is arranged independently from the air conditioner body to thereby control the humidity in the room during the heating operation.

28. A humidity control device of an air conditioner according to claim 27, wherein said target humidity setting means is arranged in the remote controller.

29. A humidity control device of an air conditioner according to claim 27, wherein said target humidity setting means is arranged in the air conditioner body in association with the controller.

30. A humidity control device of an air conditioner according to claim 16, wherein said air conditioner body includes an indoor unit installed in the room, an indoor side heat exchanger and an indoor side fan accommodated in the indoor unit, the humidity detecting means disposed on an upstream side of the indoor side heat exchanger in parallel to an air flow directed into the indoor side heat exchanger.

* * * * *